United States Patent [19]

Adams

[11] 4,209,098
[45] Jun. 24, 1980

[54] ADJUSTABLE STORAGE SYSTEM FOR FISHING RODS

[76] Inventor: John R. Adams, 835 Summit Ave., Franklin Lakes, N.J. 07414

[21] Appl. No.: 909,726

[22] Filed: May 26, 1978

[51] Int. Cl.² .............................................. A47F 7/00
[52] U.S. Cl. .................................. 211/60 R; 211/94; 248/224.2; 248/513
[58] Field of Search ..................... 211/60 R, 60 T, 94, 211/162; 248/223.4, 224.1, 224.2, 513, 534, 535, 539, 274, 287; 43/21.2; 16/94 R, 96 R

[56] References Cited

U.S. PATENT DOCUMENTS

| 2,371,433 | 3/1945 | Davis | 211/60 T |
|---|---|---|---|
| 2,615,577 | 10/1952 | Bartleman | 211/60 T |
| 2,683,891 | 7/1954 | Rosenbaum | 211/94 X |
| 3,964,706 | 6/1976 | Adams | 248/534 X |
| 4,008,872 | 2/1977 | Thompson | 248/224.2 |
| 4,034,439 | 7/1977 | Kohne | 16/96 R |

FOREIGN PATENT DOCUMENTS 401387 5/1966 Switzerland ................................ 211/94

Primary Examiner—Roy D. Frazier
Assistant Examiner—Robert W. Gibson, Jr.
Attorney, Agent, or Firm—Berman, Aisenberg & Platt

[57] ABSTRACT

A versatile, adjustable storage system for fishing rods which consists of two basic components. One component comprises an extruded storage rack adapted to be mounted on a vertical surface. The rack includes an upper L-shaped flange and a lower flange which has a dovetailed channel or slot formed longitudinally therein. The other component comprises a socket member consisting of an annulus having a rearwardly extending support which terminates in a dovetailed flange. The dovetailed flange of the socket member may be slidably inserted within the longitudinal dovetailed channel of the extrusion, and a plurality of such sockets may be fitted onto a single storage rack and may be of different or common sizes for storing any desired number or type of fishing rods.

9 Claims, 3 Drawing Figures

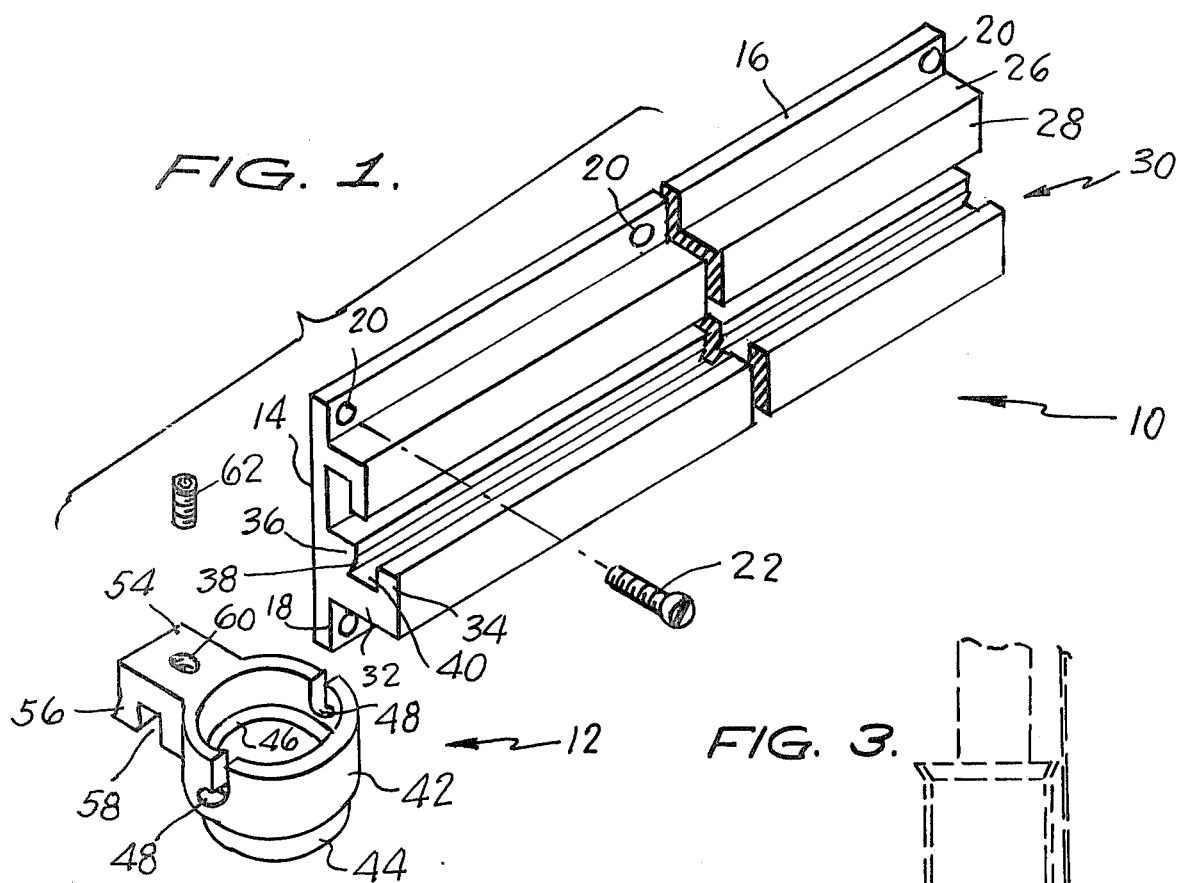

ADJUSTABLE STORAGE SYSTEM FOR FISHING RODS

BACKGROUND OF THE INVENTION

1. Field of the Invention

The present invention is related to storage systems for fishing rods and, more particularly, is directed towards a versatile, adjustable easily mounted system for storing any of a number of different or commonly sized fishing rods.

2. Description of the Prior Art

Presently known systems for storing fishing rods suffer from a common deficiency in that they are basically static systems. That is, they are permanently mounted racks or brackets which are designed for a specific spacing that limits the number and variety of rod and reel assemblies which may be stored. For each additional or differently sized rod, a new bracket must be mounted. Space limitations often limit the number and variety of rods which may be stored and, in addition, may require the dismantling of old storage racks in order to accommodate differently sized racks.

It would clearly be advantageous if a storage system for fishing rods could be devised which would be adjustable to the extent that either one or a plurality of fishing rods could easily be accommodated without requiring tools to attach or detach brackets or support structures. It would also be advantageous if such a system were flexible to the extent that it could accommodate differently sized rods at will, and if the fishing rod supports could be changed as desired to accommodate any different number, type or style of rod.

U.S. Pat. No. 3,870,259 to Reynolds is illustrative of a fishing rod mount for a single fishing rod but which is adapted for trolling or static fishing, rather than for rod storage. Other United States patents of which I am aware which illustrate storage racks or support devices include: U.S. Pat. Nos. 2,371,433; 2,375,513; 2,717,272; 3,002,630; 2,787,435; 3,042,352; 3,637,084; and 3,854,684.

OBJECTS AND SUMMARY OF THE INVENTION

It is therefore a primary object of the present invention to provide a versatile, adjustable storage system for fishing rods which overcomes all of the deficiencies noted above with respect to prior art systems.

Another object of the present invention is to provide an adjustable storage system for accommodating one or a plurality of fishing rods.

An additional object of the present invention is to provide a fishing rod storage system which includes interchangeable components by means of which the system may accommodate different sizes and styles of fishing rods on the same rack or support member.

A still further object of the present invention is to provide a storage system for one or a plurality of fishing rods which may be cheaply manufactured, easily installed, and readily adapted for individual uses and applications.

A further object of the present invention is to provide a storage system for fishing rods which may be advantageously utilized on a boat to store one or a plurality of fishing rods of one or a plurality of designs and which includes means for ensuring the structural integrity of the system during shipboard vibrations.

The foregoing and other objects are attained in accordance with one aspect of the present invention through the provision of an adjustable storage system for fishing rods, which comprises an elongated storage rack of substantially uniform cross-section which includes slotted means along its length for slidably receiving fishing rod holding means. The fishing rod holding means comprises at least one socket member which includes a rearwardly and downwardly depending flange adapted to be slidingly received within the slotted means of the storage rack. In a preferred embodiment, the slotted means in the storage rack comprises a dovetailed slot, the flange on the socket member comprising a dovetailed flange for mating with the dovetailed slot.

In accordance with another aspect of the present invention, the storage rack further includes means for retaining the fish hooks of the fishing rods stored thereby and, in a preferred embodiment, such fish hook retaining means comprises an L-shaped flange which extends longitudinally along the rack.

In a preferred embodiment, the storage rack comprises a substantially planar vertical wall, means for mounting the vertical wall on a support surface, fish hook retaining means extending forwardly and downwardly from the wall, and wherein the slotted means comprises a U-shaped bracket member positioned below the fish hook retaining means. The socket member in a preferred form includes an annular portion from which integrally extends its flange, a reduced diameter portion positioned below the annular portion, and means formed in the rearwardly extending portion of the flange for promoting horizontal stability of the socket member when installed in the storage rack. The last-named means comprises a vertical threaded slot adapted to receive an Allen screw. The annular portion of the socket member further preferably includes bayonet slots formed therein for receiving a vertically oriented rod-holding tube.

In one form of the invention, a plurality of socket members are provided, each having a substantially identical flange so as to be adapted to be received by the slotted means in a single storage rack, each of the socket members having different sized rod tube receiving annular portions so as to enable the rack to store a plurality of differently sized fishing rods.

In a preferred form, the storage rack is formed of extruded aluminum, while the socket members consist of a die cast aluminum piece.

BRIEF DESCRIPTION OF THE DRAWINGS

Various objects, features and attendant advantages of the present invention will be more fully appreciated as the same become better understood from the following detailed descrption of the present invention when considered in connection with the accompanying drawings, in which:

FIG. 1 is a perspective, partially broken, exploded view which illustrates the basic components of a preferred embodiment of an adjustable storage system for fishing rods in accordance with the present invention;

FIG. 2 is a partial plan view which illustrates the preferred embodiment of FIG. 1 in an assembled condition; and FIG. 3 is a cross-sectional view of the component illustrated in FIG. 2 and taken along lines 3—3 thereof.

DETAILED DESCRIPTION OF THE PREFERRED EMBODIMENT

Referring now to the drawings, wherein like reference numerals represent identical or corresponding parts throughout the several views, and more particularly to FIG. 1, a preferred embodiment of the adjustable storage system for fishing rods in accordance with the present invention is illustrated and includes a storage rack indicated generally by reference numeral 10, and at least one socket member indicated generally by reference numeral 12. The storage rack is preferably formed of extruded aluminum and has a uniform cross-section along its entire length, while the socket member 12 is preferably formed of die cast aluminum.

The storage rack 10 includes a base vertical wall 14 whose rear surface is substantially planar in order that the rack 10 may be mounted on a planar support surface. To this end, wall 14 includes upper and lower mounting flanges 16 and 18, respectively, which may have a plurality of mounting holes 20 located therein for receiving threaded screws 22 or other suitable securing means.

Extending outwardly and downwardly from the upper mounting flange 16 is a hook or L-shaped member 24 which comprises a substantially horizontal portion 26 and a downwardly extending vertical portion 28. The purpose of member 24 is to serve as a fishing hook retaining means, as particularly illustrated in FIG. 3, and which will be described in greater detail hereinafter.

Positioned below the hook retaining member 24 and also extending outwardly from the vertical wall 14 is a socket retaining portion indicated generally by reference numeral 30. Socket retaining portion 30 includes a lower horizontally extending support member 32 from the end of which upwardly extends a forward lip 34. Parallel to the lip 34 but spaced adjacent the rear wall 14 is a rear support member 36 which has a forwardly facing outer surface 38 which is angled so as to form a dovetailed slot 40 along the entire length of the socket retaining portion 30 of rack 10.

The socket member 12 is adapted to be received within the dovetailed slot 40. Socket member 12 includes an annular portion 42 below which is formed a reduced diameter portion 44 for defining a ledge or lip 46. A pair of bayonet slots 48 are formed in the annular portion 42 at diametrically opposed positions. The bayonet slots 48 are adapted to cooperate with retaining pins (not shown) formed on the outer surface of a rod-holding tube 50 (FIG. 3), the structure and function of which is set forth in greater detail in my prior U.S. Pat. No. 3,964,706. Briefly, the sleeve or tube 50 is adapted to slidably receive and hold a fishing rod handle 52 and, as described above, the sleeve 50 may be secured to socket member 12 by means of the bayonet slots 48.

Extending rearwardly from the upper annular portion 42 is a bracket or mounting flange 54 at the end of which downwardly extends a dovetailed flange 56 which is sized and adapted to mate within the dovetailed slot 40 of rack 10. Between the annular portion 42 and the dovetailed flange 56 is formed a substantially rectangular downwardly opening slot 58 which is sized so as to snugly interfit with the upwardly extending lip 34 of the socket retaining portion 30 of rack 10.

Also provided on the upper planar surface of flange 54 is a threaded hole 60 for receiving, for example, an Allen screw 62 which secures the socket member 12 in a horizontal plane, the interfitting of the dovetailed flange 56 and lip 34 providing vertical stability.

FIG. 3 illustrates in phantom outline the manner of mounting a fishing rod handle 52 and auxiliary tube 50 to the preferred embodiment of the present invention for storage. After the sleeve 50 is secured within the bayonet slots 48 of socket member 12, and the rod handle 52 is placed within the sleeve 50, the hook 66 of the rod, positioned at the end of line 64, is inserted about the L-shaped hook retaining means 24. The user then tightens the reel drag to provide additional safety and stability for the rod.

It may be appreciated that the rack 10 of the present invention may be cut to any desired length to accommodate any of a number of socket members 12. It would even be possible to cut the rack 10 into very small lengths for mounting individual rods, nets, gaffs, or the like.

The dovetailed socket 40 may be entered from either end of the rack 10, and accordingly the socket member 12 may be positioned at any desired point. This versatility enables a user to install more fresh water equipment in a given area than is possible with larger salt water gear. Clearly, two or more racks 10 could easily be aligned to accommodate even more sockets and fishing rods. Finally, a larger diameter socket 12 could be provided with a similarly sized mounting flange so as to accommodate larger salt water gear and provide instant interchange or mixing of equipment on the same rack.

Obviously, numerous modifications and variations of the present invention are possible in light of the above teachings. It is therefore to be understood that within the scope of the appended claims, the invention may be practiced otherwise than as specifically described herein.

I claim as my invention:

1. An adjustable storage system for fishing rods which comprises an elongated storage rack and at least one socket member mounted on said rack for longitudinal sliding movement therealong, said rack comprising a base, a support member projecting from said base with its outer end spaced therefrom, an upwardly opening slot extending longitudinally along said support member, and a downwardly opening hook member projecting from said base and positioned above said support member with the outer end of said hook member spaced inwardly of the outer end of said support member, said socket member including a mounting bracket projecting therefrom and having a downwardly extending flange receivable in said slot for sliding movement to any selected position therein, whereby a fishing rod may be carried by said socket and space is provided between said fishing rod and said hook member to permit the insertion of a fishing hook into said hook member.

2. The adjustable storage system for fishing rods as set forth in claim 1, wherein said slot is dovetailed, and wherein said flange on said socket member comprises a dovetailed flange for mating with said dovetailed slot.

3. The adjustable storage system for fishing rods as set forth in claim 1, wherein said hook member comprises an L-shaped flange extending longitudinally along said rack.

4. The adjustable storage system for fishing rods as set forth in claim 1, wherein said socket member further comprises:

an annular portion from which integrally extends said flange;

a reduced diameter portion positioned below said annular portion; and means formed in said flange for promoting horizontal stability of said socket member when installed in said storage rack.

5. The adjustable storage system for fishing rods as set forth in claim 4, wherein said means for promoting horizontal stability comprises a vertical threaded slot and a set screw received therein.

6. The adjustable storage system for fishing rods as set forth in claim 4, wherein said annular portion further includes bayonet slots formed therein for vertically receiving a rod-holding tube.

7. The adjustable storage system for fishing rods as set forth in claim 1, further comprising at least two socket members each having a substantially identical flange adapted to be received by said slot in said storage rack and different sized rod tube receiving annular portions, whereby said rack may be adapted to store a plurality of differently sized fishing rods.

8. The adjustable storage system for fishing rods as set forth in claim 1, wherein said storage rack is formed of an extruded material.

9. The adjustable storage system for fishing rods as set forth in claim 1, wherein said base comprises a substantially planar vertical wall, and means are provided for mounting said vertical wall on a support surface.

* * * * *